Patented June 1, 1948

2,442,555

UNITED STATES PATENT OFFICE 2,442,555

DIETHYLAMINOETHYL PIPERATE HYDROCHLORIDE

Martin E. Synerholm, Hastings on Hudson, N. Y., assignor to Boyce Thompson Institute for Plant Research, Inc., a corporation of New York No Drawing. Application March 7, 1946, Serial No. 652,809

1 Claim. (Cl. 260—338)

This invention relates to organic chemistry and has for its object the provision of organic compounds. More particularly, the invention is concerned with the provision of a dialkylamino alkyl piperate and its hydrochloride. The new compounds of the invention are characterized by being non-toxic and having the power of producing local anaesthesia, and the hydrochloride, being highly soluble in water, is especially effective for this purpose. The compounds of the invention are less toxic than cocaine and novocaine and are at least as effective as local anaesthetics.

The hydrochloride of my invention is represented by the formula

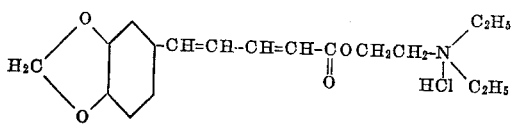

The preparation of compounds of the invention will be described in connection with the preparation of diethylaminoethyl piperate which is prepared by esterifying piperic acid with diethylaminoethyl alcohol. The piperic acid is obtained by hydrolysis of piperine according to well-known methods. The diethylaminoethyl alcohol and piperic acid may be esterified by any of the usual methods of effecting esterification. I prepared the piperoyl chloride by allowing an excess of thionyl chloride to react with the piperic acid in benzene. The piperoyl chloride was obtained by adding a large volume of petroleum ether, whereupon the chloride crystallized and was filtered off. The piperoyl chloride was reacted with the diethylaminoethyl alcohol giving the ester hydrochloride which was obtained pure by recrystallization from absolute ethyl alcohol. The pure ester hydrochloride melted at 187–8°. The hydrochloride is water soluble and may be boiled in aqueous solution without decomposition.

Tests have indicated that this compound is much less toxic toward mice when injected intraperitoneally than either novocaine (p-aminobenzoyldiethyl-aminoethanol hydrochloride) or cocaine which are commonly used as local anaesthetics. It is of the same order of effectiveness as cocaine in the desensitization of the cornea of the eye of a guinea pig. I have also found that this compound is effective when placed upon the tip of the tongue in desensitizing this area. The compound is of the same order of effectiveness as cocaine in the eviscerated frog test.

I claim:

The compound

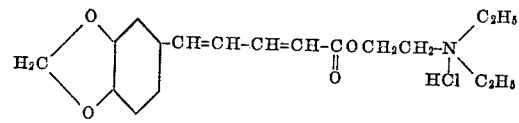

MARTIN E. SYNERHOLM.

REFERENCES CITED

The following references are of record in the file of this patent:

Synerholm, Hatzell, & Arthur, Contrib. of the Boyce Thompson Instit., 13, 433–42 (1945).